(12) United States Patent
Noda et al.

(10) Patent No.: US 7,697,042 B2
(45) Date of Patent: Apr. 13, 2010

(54) SOLID-STATE IMAGE PICKUP DEVICE AND CAMERA

(75) Inventors: Tomoyuki Noda, Atsugi (JP); Shin Kikuchi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1360 days.

(21) Appl. No.: 11/134,395

(22) Filed: May 23, 2005

(65) Prior Publication Data

US 2005/0270393 A1 Dec. 8, 2005

(30) Foreign Application Priority Data

Jun. 2, 2004 (JP) ............................. 2004-164637

(51) Int. Cl.
*H04N 5/217* (2006.01)
*H04N 3/14* (2006.01)

(52) U.S. Cl. ...................................... 348/241; 348/300
(58) Field of Classification Search ................ 348/241, 348/222.1, 300, 243, 251
See application file for complete search history.

(56) References Cited

U.S. PATENT DOCUMENTS

| | | | | |
|---|---|---|---|---|
| 5,949,483 | A * | 9/1999 | Fossum et al. | 348/303 |
| 6,222,175 | B1 * | 4/2001 | Krymski | 250/208.1 |
| 6,674,470 | B1 * | 1/2004 | Tanaka et al. | 348/308 |
| 7,154,075 | B2 * | 12/2006 | Krymski | 348/241 |
| 7,515,183 | B2 * | 4/2009 | Yang et al. | 348/241 |
| 2005/0052552 | A1 * | 3/2005 | Hashimoto | 348/272 |
| 2005/0259167 | A1 | 11/2005 | Inoue et al. | 348/300 |
| 2005/0270392 | A1 | 12/2005 | Kikuchi | 348/308 |

FOREIGN PATENT DOCUMENTS

| | | |
|---|---|---|
| JP | 2000-106653 | 1/1989 |
| JP | 2000-261728 | 9/2000 |
| JP | 2003-18469 | 1/2003 |

OTHER PUBLICATIONS

A. Yusa, et al., "SIT Image Sensor: Design Considerations and Characteristics", IEEE trans., vol. ED-33, No. 6, pp. 735-742, Jun. 1986.
N. Tanaka, et al. "A 310K Pixel Bipolar Imager (Basis)", IEEE trans. on Electron Devices, vol. 37, No. 4, pp. 964-971, Apr. 1990.
Nakamura, et al., "Gate Storage Type MOS Phototransistor Image Sensor" (AMI (Amplified MOS Intelligent Imager)), J. Of the Inst. Of Television Engineers of Japan, vol. 41, No. 11, pp. 1075-1082, Nov. 1987.

* cited by examiner

*Primary Examiner*—Nhan T Tran
(74) *Attorney, Agent, or Firm*—Fitzpatrick, Cella, Harper & Scinto

(57) ABSTRACT

A solid-state image pickup device that reduces the number of necessary sampling and holding capacitors has signal lines to which photoreceiving elements are connected, a clamp circuit having clamp capacitors in which one terminal is connected to the signal lines and the other terminals are short-circuited and a switch applying a reference voltage to the other terminals by the clamping operation and adding signals from the photoreceiving elements provided in the row direction along with the clamping operation, an adder which is connected to the other terminals of the clamp capacitors, adds addition signals of the respective photoreceiving element rows outputted from the other terminals and adds the signals of the plurality of photoreceiving elements provided in the column direction, an amplifier connected to the adder, a switch resetting the input side of the amplifier, and a circuit for outputting an offset of the amplifier and the signal from the amplifier.

11 Claims, 13 Drawing Sheets

SOLID-STATE IMAGE PICKUP DEVICE AND CAMERA

BACKGROUND OF THE INVENTION

1. Field of the Invention

The invention relates to a solid-state image pickup device having photoreceiving elements and, more particularly, to a solid-state image pickup device which can add signals from photoreceiving elements.

2. Related Background Art

A number of solid-state image pickup devices in each of which pixels including photoelectric conversion units are one-dimensionally or two-dimensionally arranged are used in digital cameras, video cameras, copying apparatuses, facsimile apparatuses, and the like. As solid-state image pickup devices, there are an amplifying type solid-state image pickup device such as CCD image pickup device, CMOS image pickup device, and the like.

In association with an increase in the number of pixels of an image sensor such as a solid-state image pickup device, in recent years, not only the conventional usage where signals of all pixels of the image sensor are always simply sequentially outputted but also usage where the signals of only a part of the pixels are outputted from the image sensor as necessary or a using method whereby usage where after the signals of the pixels are processed to a certain extent, they are outputted from the image sensor have been in high demand. For example, addition of the signals of the adjacent pixels and outputting of an addition signal from the image sensor if often executed for a better color process, resolution conversion, and the like. A method of reducing random noises by adding and averaging the signals of a larger number of pixels in the image sensor is also used.

An adding method disclosed in JP-A-2000-106653 as a Japanese Patent is shown in FIG. 12. FIG. 12 is a diagram showing a schematic construction of a 2H-line memory+2H-line adder circuit. Second vertical signal lines 17 (17-1, 17-2, . . . ) are connected to first vertical signal lines 8 (8-1, 8-2, . . . ) through sampling and holding transistors (S/H transistors) 29 (29-1, 29-2, . . . ) and capacitors C1 (C1-1, C1-2, . . . ), respectively. Although only two first vertical signal lines 8 are shown for simplicity of the drawing, a plurality of first vertical signal lines 8 are actually arranged in the lateral direction. Two sets of serial connection are connected to the second vertical signal lines 17 (17-1, 17-2, . . . ): that is, the serial connection of transistors 23 (23-1, 23-2, . . . ) and capacitors C2 (C2-1, C2-2, . . . ); and the serial connection of transistors 26 (26-1, 26-2, . . . ) and capacitors C3 (C3-1, C3-2, . . . ). A signal voltage of the 2Nth row is accumulated into the capacitor C2 through the transistor 23. A signal voltage of the (2N+1)th row is accumulated into the capacitor C3 through the transistor 26. The signal voltage of the 2Nth row and that of the (2N+1)th row are added by the second vertical signal line 17.

An adder circuit disclosed in JP-A-2000-261728 as a Japanese Patent is shown in FIG. 13. Signal components are accumulated into storage capacitors 43 and 49 from vertical output lines connected to the pixels through transfer switches 41 and 48, respectively. At the next timing, signal components of the pixels of another row are accumulated into a storage capacitor 45 through a transfer switch 42. After that, by turning on transfer switches 46, 47, and 50 by a control signal from a shift register 61, an addition component of the pixel signals of the two vertical output lines can be obtained in a horizontal output line 62. At this time, in FIG. 13, with respect to the signal components of the pixels of other rows, since the signal in the storage capacitor 45 is added together with the signal component in the storage capacitor 43, the added signal component of at least three pixels can be obtained.

In the conventional addition averaging means, however, the signals in the horizontal direction are added after the signals in the vertical direction are added. Therefore, in the case of adding the signal components of (m pixels in the horizontal direction)×(n pixels in the vertical direction) in a pixel array of (H columns×V rows), (n×H) sampling and holding (S/H) capacitors [in the case of the 2×2 addition, 2H S/H capacitors; in the case of the 3×3 addition, 3H S/H capacitors; . . . ] are necessary. There is, consequently, such a problem that the more a number of addition pixels exist in the vertical direction, the more a number of S/H capacitors increases are necessary, so that a size of the adder circuit increases.

SUMMARY OF THE INVENTION

It is an object of the invention to miniaturize a signal adder circuit for adding signals of a plurality of pixels which are two-dimensionally arranged.

To accomplish the above object, according to the invention, there is provided a solid-state image pickup device comprising:

a plurality of photoreceiving elements which are two-dimensionally arranged;

a plurality of signal lines to which the plurality of photoreceiving elements provided in the column direction are connected, respectively;

a clamp circuit that has a plurality of clamp capacitors having one terminal connected to the plurality of signal lines and the other terminals short-circuited mutually, has switching means which is connected to the other terminals of the plurality of clamp capacitors and applies a reference voltage to the other terminals by a clamping operation, and adds signals from the plurality of photoreceiving elements provided in the row direction along with the clamping operation; and signal adding means which is connected to the other terminals of the plurality of clamp capacitors, adds addition signals of the respective photoreceiving element rows which are outputted from the other terminals, and adds the signals of the plurality of photoreceiving elements provided in the column direction.

According to the invention, in the case of executing the signal addition of (m pixels in the horizontal direction)×(n pixels in the vertical direction) in the pixel array of (H columns×V rows), the number of necessary sampling and holding capacitors can be reduced to H+(n/m)*H.

According to the invention, the random noises of the photoreceiving elements can be suppressed by adding and averaging the signals. In dependence on a type of photoreceiving element, reset noises (random components) of the photoreceiving elements can be also eliminated by operating timing for the clamping operation and the pixel resetting operation.

DETAILED DESCRIPTION OF THE PREFERRED EMBODIMENTS

Embodiments of the invention will be described in detail hereinbelow with reference to the drawings.

First, reference examples regarding the invention will be described prior to explaining the invention.

Reference Example 1

Figure 7:
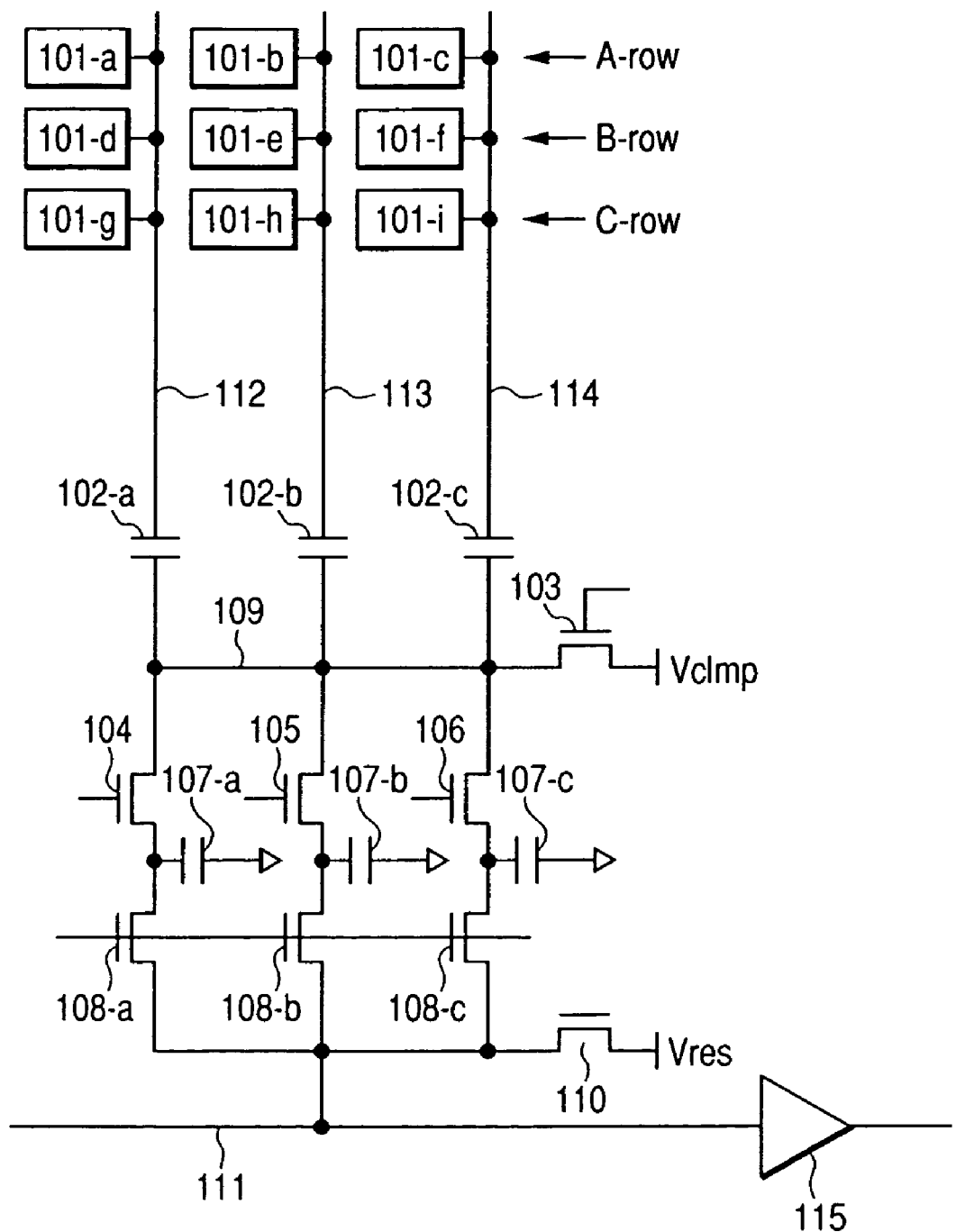
FIG. 7 is a diagram showing a circuit of a solid-state image pickup device according to the first reference example regarding the invention.

FIG. 7 shows the first reference example regarding the invention. This reference example shows an example of a case of executing a signal addition (averaging) of (3 pixels in the horizontal direction)×(3 pixels in the vertical direction) in a pixel array of (H columns×V rows).

In FIG. 7, reference numerals 101-a to 101-i denote photoreceiving elements which are two-dimensionally arranged. Reference numerals 112 to 114 denote-vertical output lines to which a photoreceiving element train constructed by the photoreceiving elements 101-a, 101-d, and 101-g, a photoreceiving element train constructed by the photoreceiving elements 101-b, 101-e, and 101-h, and a photoreceiving element train constructed by the photoreceiving elements 101-c, 101-f, and 101-i are connected, respectively. Reference numerals 102-a to 102-c denote clamp capacitors in which one terminal is connected to the vertical output lines 112 to 114 and the other terminals are connected in common. Signals of the pixels in the horizontal direction are added by using those capacitors. Reference numeral 103 denotes an MOS switch for clamping which is connected to the commonly-connected other terminals of the clamp capacitors 102-a to 102-c. The clamping MOS switch 103 is connected to a clamp voltage Vclmp. Reference numeral 109 denotes a common line for averaging outputs after the clamping and 104 to 106 indicate MOS switches for selecting the S/H capacitors. The MOS switches 104 to 106 are connected to the commonly-connected other terminals of the clamp capacitors 102-a to 102-c and used to select the S/H capacitors. Reference numerals 107-a to 107-c denote sampling and holding capacitors serving as signal retaining means which are connected to the other terminals of the clamp capacitors 102-a to 102-c through the MOS switches for selecting the S/H capacitors. Reference numerals 108-a to 108-c denote MOS switches for adding signals of the pixels in the vertical direction. By simultaneously turning on those MOS switches, voltages written in the S/H capacitors 107-a to 107-c can be averaged and the signal addition in the vertical direction can be executed. Reference numeral 111 denotes an output line; 110 an MOS transistor for resetting the output line 111. The MOS transistor 110 is connected to a resetting voltage Vres. Reference numeral 115 denotes an output amplifier.

Figure 8:
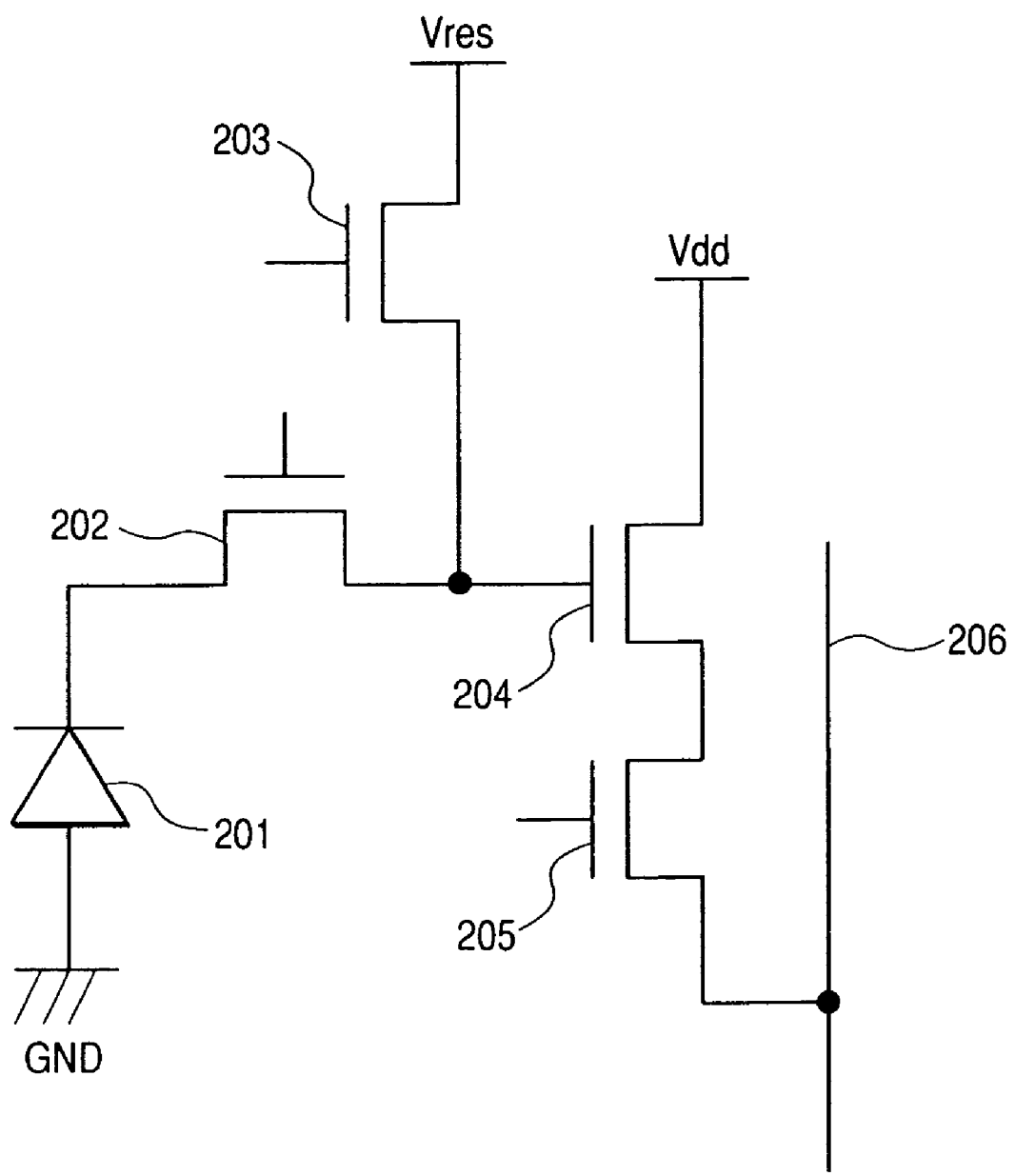
FIG. 8 is a diagram showing an example of a photoreceiving element.

An example of the pixel is shown in FIG. 8. Reference numeral 201 denotes a photoelectric conversion unit; 202 a transfer MOS transistor for transferring signal charges from the photoelectric conversion unit 201 to a floating diffusion region (not shown); and 203 a resetting MOS transistor whose drain terminal is connected to the resetting voltage Vres. The MOS transistor 203 resets signal charges in the floating diffusion region. Reference numeral 204 denotes an amplifying MOS transistor in which a drain terminal is connected to a power voltage Vdd and a gate is connected to the floating diffusion region. Reference numeral 205 denotes an MOS transistor for selecting and 206 an output line to which the selecting MOS transistor 205 is connected.

Figure 9:
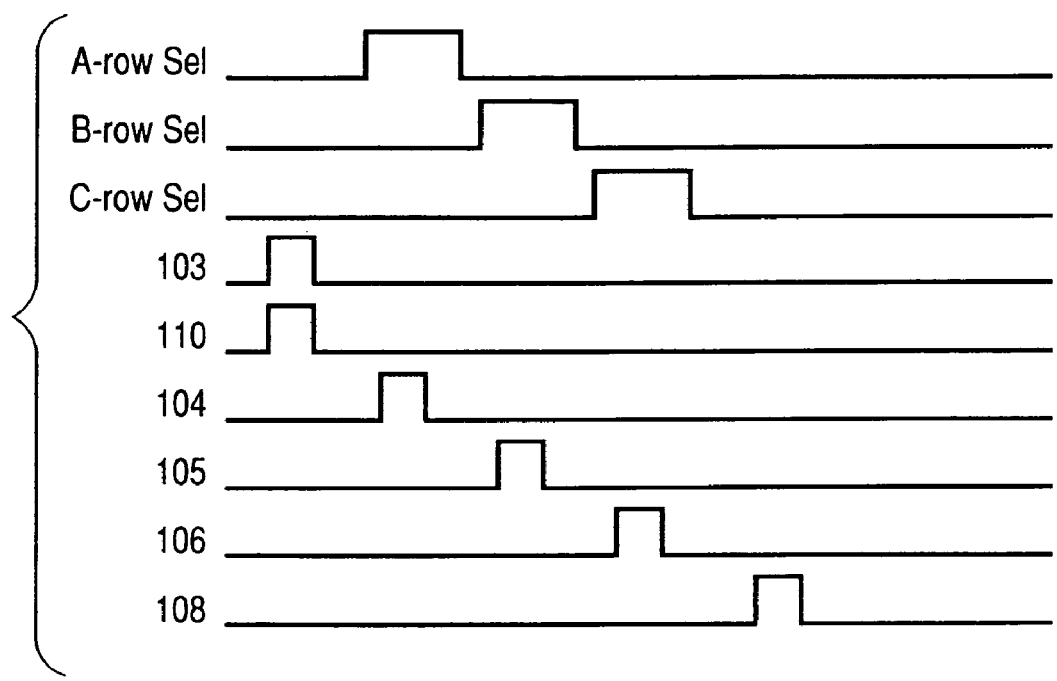
FIG. 9 is a diagram showing the operation of the solid-state image pickup device according to the first reference example regarding the invention.

Operation timing of this circuit is shown in FIG. 9. In FIG. 9, reference numerals 103 to 108 denote pulse signals which are applied to the MOS transistors. First, the MOS transistor 103 is turned on and the reference clamp voltage Vclmp is written to the common line 109. At the same time, the MOS transistor 110 is turned on and the output line 111 is reset to Vres. At this time, by turning on the resetting MOS transistor, the noise signals are read out from the pixels to the vertical output lines 112 to 114. After that, the MOS transistor 103 is turned off.

Subsequently, an A-row (photoreceiving elements 101-a to 101-c) is selected, the signal of the photoreceiving element 101-a is outputted to the vertical output line 112, the signal of the photoreceiving element 101-b is outputted to the vertical output line 113, and the signal of the photoreceiving element 101-c is outputted to the vertical output line 114, respectively. At this time, since the MOS transistor 103 is in the OFF state, an electric potential of the common line 109 is changed by an amount of the average output of the photoreceiving elements 101-a to 101-c. A variation of the resetting of the common line can be eliminated by the operation mentioned above and the signals of the photoreceiving elements 101-a to 101-c are added and averaged. That is, a change amount of the electric potential of each of the vertical output lines 112 to 114 is equal to an amount obtained by subtracting the noise signal from the signal. A fluctuation amount of the electric potential of the common line 109 is equal to an average output component of an amount obtained by subtracting the noise signal from the signals the vertical output lines 112 to 114. The adding process of the noise-removed signals from the photoreceiving elements 101-a to 101-c as mentioned above can be executed along with the clamping operation.

After that, by turning on the MOS transistor 104, the addition average output of the signals from the photoreceiving elements 101-a to 101-c is held in the S/H capacitor 107-a.

By executing the operation similar to that mentioned above with respect to each of a B-row and a C-row, an addition average output of signals from the photoreceiving elements 101-d to 101-f is held in the S/H capacitor 107-b and an addition average output of signals from the photoreceiving elements 101-g to 101-i is held in the S/H capacitor 107-c, respectively.

Lastly, by turning on the MOS transistors 108-a to 108-c, the addition average of the signals of nine pixels of the photoreceiving elements 101-a to 101-i stored in the S/H capacitors 107-a to 107-c can be outputted to the output line 111 through the output amplifier 115.

In the reference example, by adding the signals by using such a method, the signal addition in the horizontal direction can be executed simultaneously with the clamping operation. Although the n*H [3H in the case of the 3×3 addition] capacitors were necessary as capacitors for the addition sampling and holding in the conventional system, they can be omitted up to H+(n/m)*H [2H in the case of the 3×3 addition] capacitors. Therefore, the signal adder circuit can be simplified along with the noise elimination. Thus, the signal adder circuit can be simplified and by executing the addition averaging process to the signals by using such a signal adder circuit, the random noises can be also eliminated.

Reference Example 2

Figure 10:
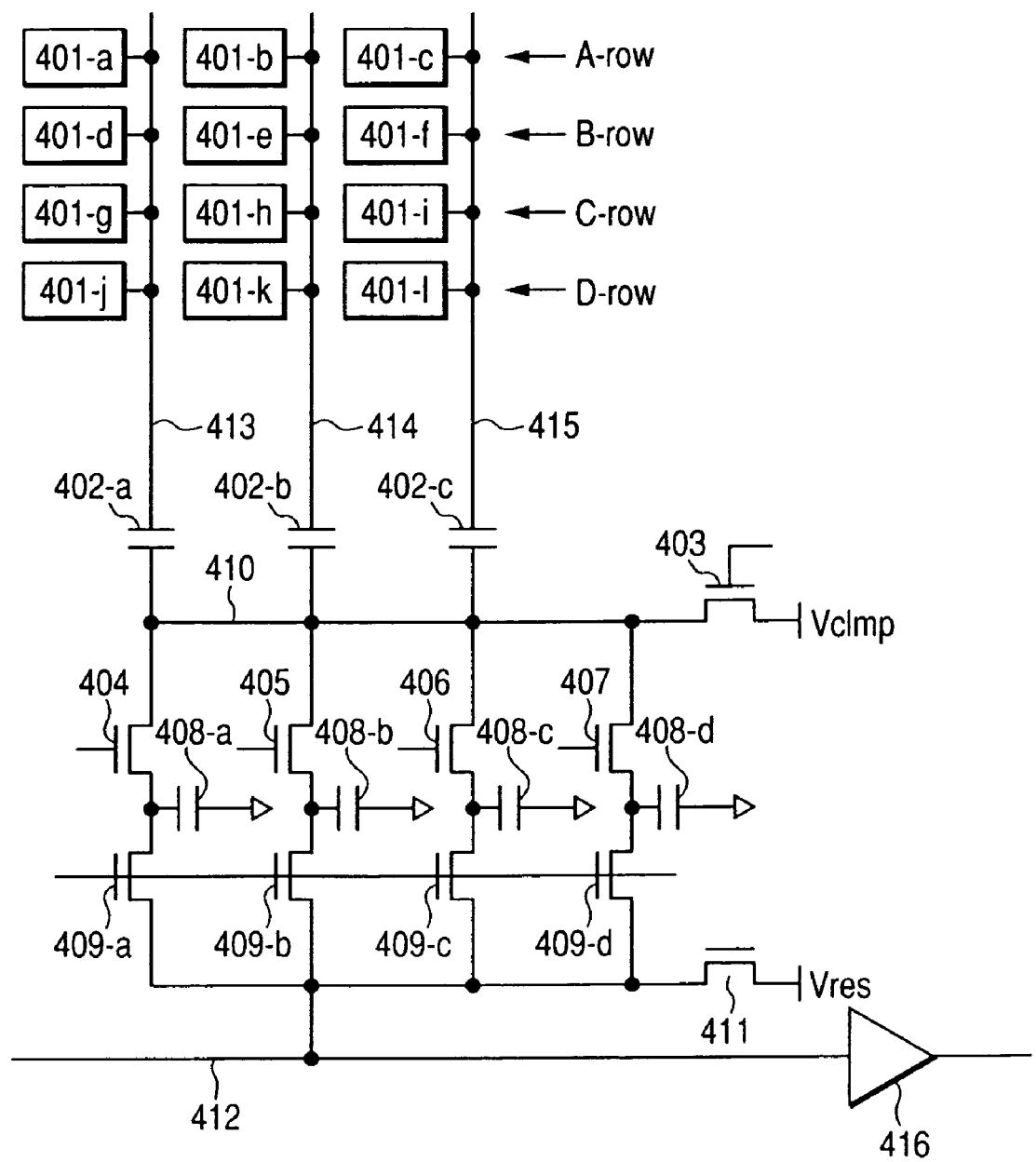
FIG. 10 is a diagram showing a circuit of a solid-state image pickup device according to the second reference example regarding the invention.

FIG. 10 shows the second reference example of the invention. This reference example shows an example of a case of executing a signal addition of (3 pixels in the horizontal direction)×(4 pixels in the vertical direction) in a pixel array of (H columns×V rows).

In FIG. 10, reference numerals 401-a to 401-P denote photoreceiving elements which are two-dimensionally arranged. Reference numerals 413 to 415 denote vertical output lines. Reference numerals 402-a to 402-c denote clamp capacitors. The signal addition in the horizontal direction is executed by using those capacitors. Reference numeral 403 denotes an MOS switch for clamping which is connected to the clamp voltage Vclmp; 410 a common line for averaging outputs after the clamping; and 404 to 407 MOS switches for selecting the S/H capacitors. The MOS switches 404 to 407 are used to select the S/H capacitors. Reference numerals 408-a to 408-d denote sampling and holding capacitors and 409-a to 409-d indicate MOS switches for executing the signal addition in the vertical direction. By simultaneously turning on those MOS switches, voltages written in the S/H capacitors 408-a to 408-d can be added (averaged) and the signal addition in the vertical direction can be executed. Reference numeral 412 denotes an output line and 411 indicates an MOS transistor for resetting the output line 412. The MOS transistor 411 is connected to the resetting voltage Vres. Reference numeral 416 denotes an output amplifier.

Figure 11:
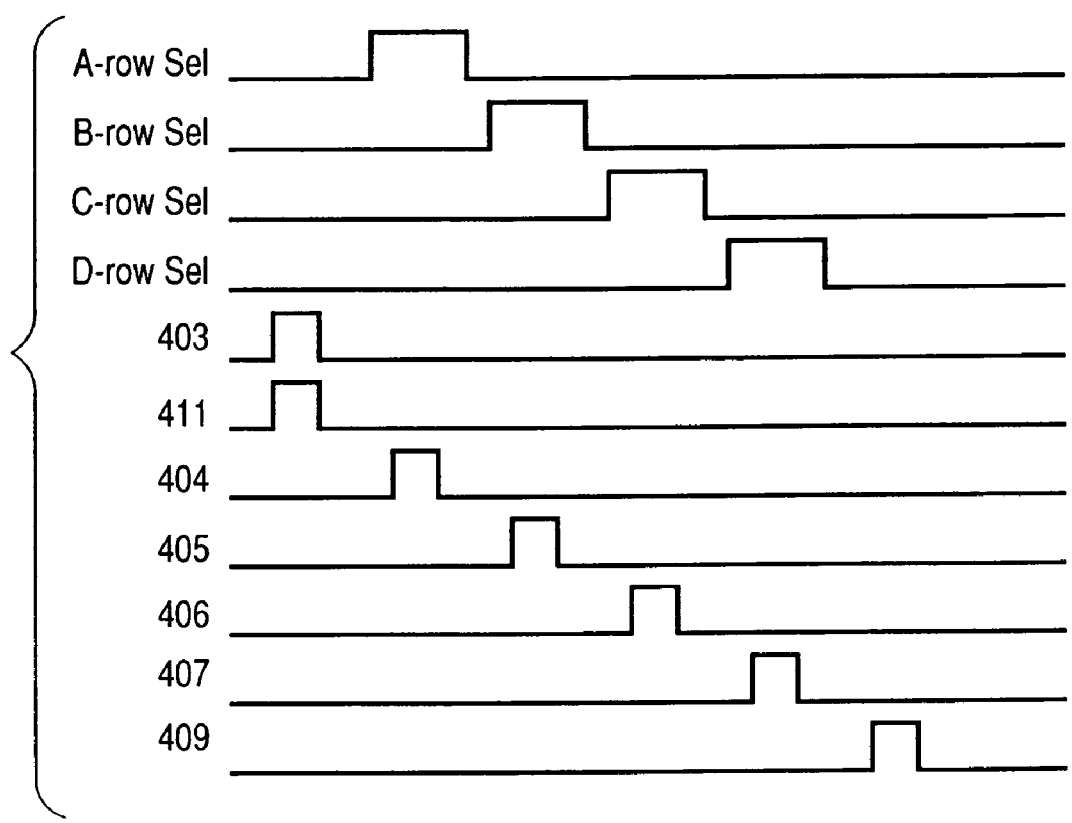
FIG. 11 is a diagram showing the operation of the solid-state image pickup device according to the second reference example regarding the invention.
Figure 12:
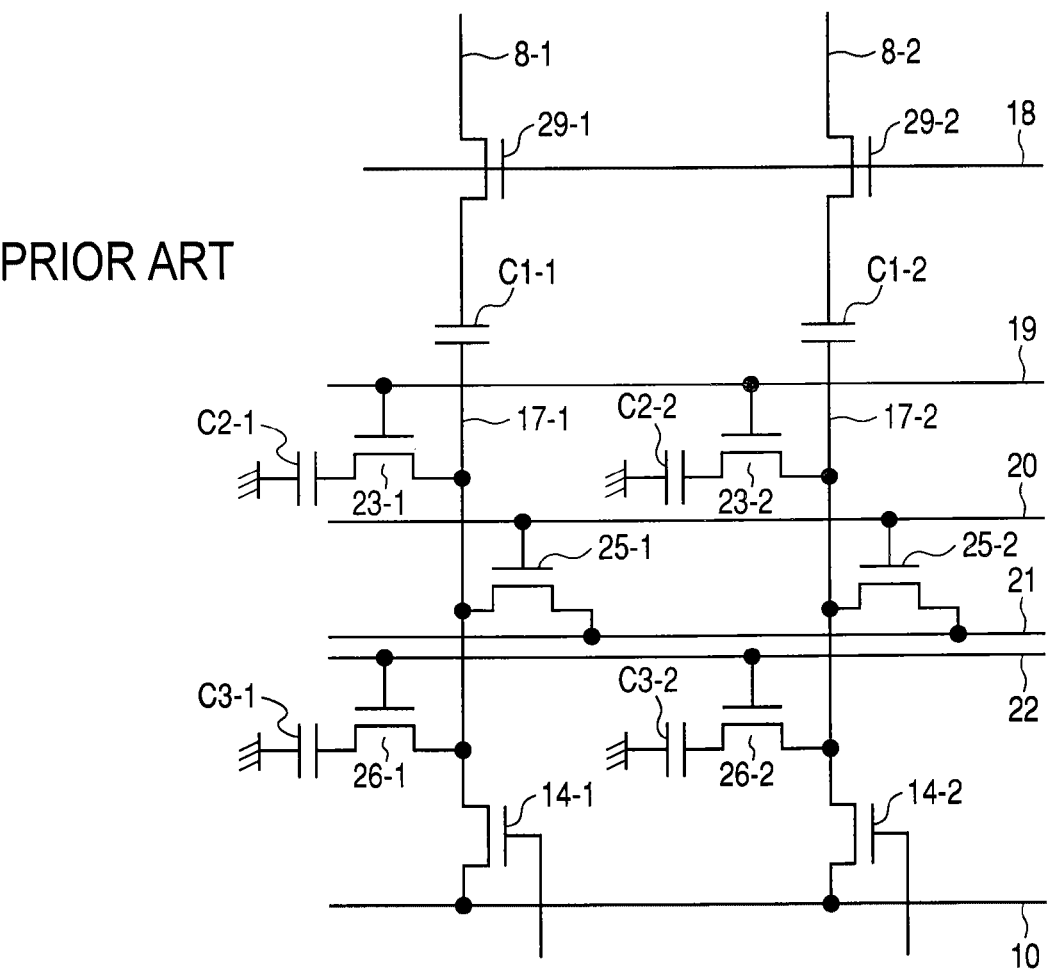
FIG. 12 is a diagram showing a conventional signal adder circuit.
Figure 13:
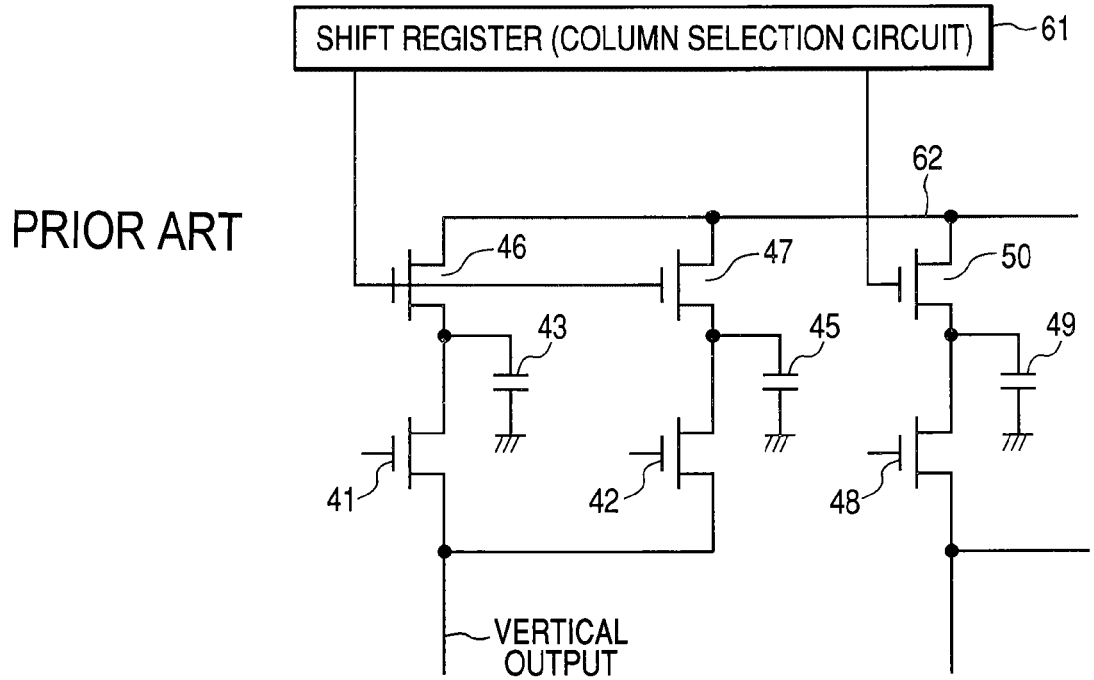
FIG. 13 is a diagram showing another conventional signal adder circuit.

Operation timing of this circuit is shown in FIG. 11. First, the MOS transistor 403 is turned on and the reference clamp voltage Vclmp is written to the common line 410. At the same time, the MOS transistor 411 is turned on and the output line 412 is reset. Subsequently, an A-row (photoreceiving elements 401-a to 401-c) is selected, the signal of the photoreceiving element 401-a is outputted to the vertical output line 413, the signal of the photoreceiving element 401-b is outputted to the vertical output line 414, and the signal of the photoreceiving element 401-c is outputted to the vertical output line 415, respectively. At this time, since the MOS transistor 403 is in the OFF state, an electric potential of the common line 410 is changed by an amount of the average output of the photoreceiving elements 401-a to 401-c. A variation of the resetting of the common line can be eliminated by the operation mentioned above and the signals of the photoreceiving elements 401-a to 401-c are added and averaged. After that, by turning on the MOS transistor 404, the addition average output of the signals from the photoreceiving elements 401-a to 401-c is held in the S/H capacitor 408-a.

By executing the operation similar to that mentioned above with respect to each of the B-row, the C-row, and a D-row, an addition average output of signals from the photoreceiving elements 401-d to 401-f is held in the S/H capacitor 408-b, an addition average output of signals from the photoreceiving elements 401-g to 401-i is held in the S/H capacitor 408-c, and an addition average output of signals from the photoreceiving elements 401-j to 401-P is held in the S/H capacitor 408-c, respectively.

Lastly, by turning on the MOS transistor 409, the addition average of the signals of 12 pixels of the photoreceiving elements 401-a to 401-P stored in the S/H capacitors 408-a to 408-d can be outputted to the output line 412 through the output amplifier.

In the reference example, by adding the signals by using such a method, the signal addition in the horizontal direction can be executed simultaneously with the clamping operation. Although the n*H [4H in the case of the 3×4 addition] capacitors were necessary as capacitors for the addition sampling and holding in the conventional system, they can be omitted up to H+(n/m)*H [3H in the case of the 3×3 addition] capacitors. Therefore, the signal adder circuit can be simplified and the random noises can be also eliminated by executing the addition averaging process by using such a circuit.

The reference example regarding the invention has been described above. Embodiments of the invention will be described hereinbelow.

Embodiment 1

Figure 1:
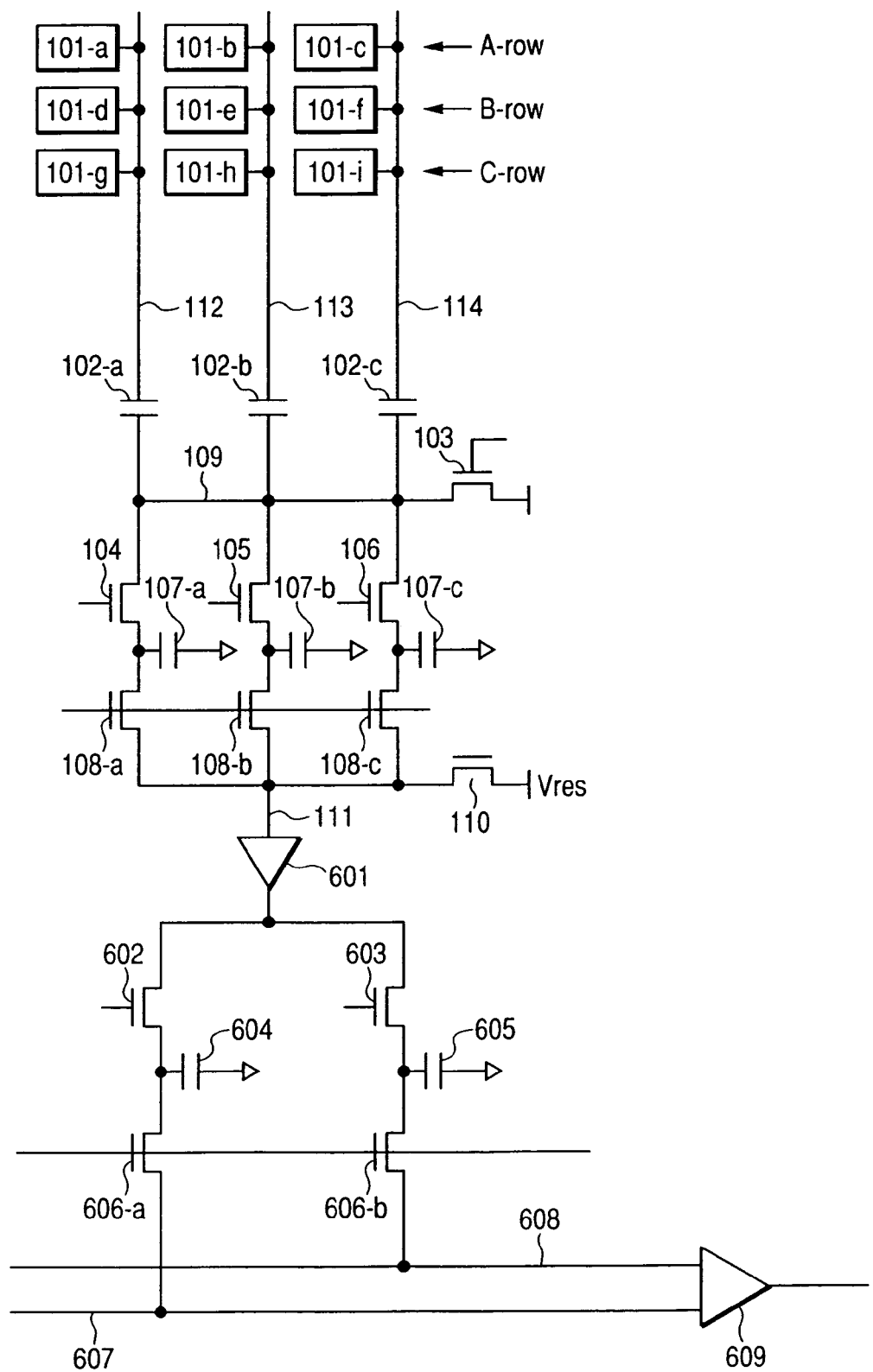
FIG. 1 is a diagram showing a circuit of a solid-state image pickup device according to the first embodiment of the invention.

FIG. 1 shows the first embodiment according to the invention. This embodiment shows an example of the case of executing the addition of signals of (3 pixels in the horizontal direction)×(3 pixels in the vertical direction) in the pixel array of (H columns×V rows). By using this embodiment, loss of the signal components can be reduced more than that in the reference example 1. The same or similar component elements as those shown in FIG. 7 are designated by the same reference numerals and their description is omitted. Naturally, a construction of the embodiment can be also applied to the case of executing the addition of signals of (3 pixels in the horizontal direction)×(4 pixels in the vertical direction) in the pixel array of (H columns×V rows).

In FIG. 1, reference numeral 601 denotes a source follower amplifier; 602, 603, 606-a, and 606-b MOS switches; and 604 and 605 line memories. By turning on the MOS switch 602, a noise signal (containing an offset of the source follower amplifier) is written into the line memory 604. By turning on the MOS switch 603, an output signal can be written into the line memory 605. By turning on the MOS switches 606-a and 606-b, the voltages written in the line memories 604 and 605 can be read out. Reference numeral 607 denotes a horizontal output line for the noise signal; 608 a horizontal output line for the output signal; and 609 a differential amplifier which can output the voltage obtained by subtracting the noise signal from the output signal.

Figure 2:
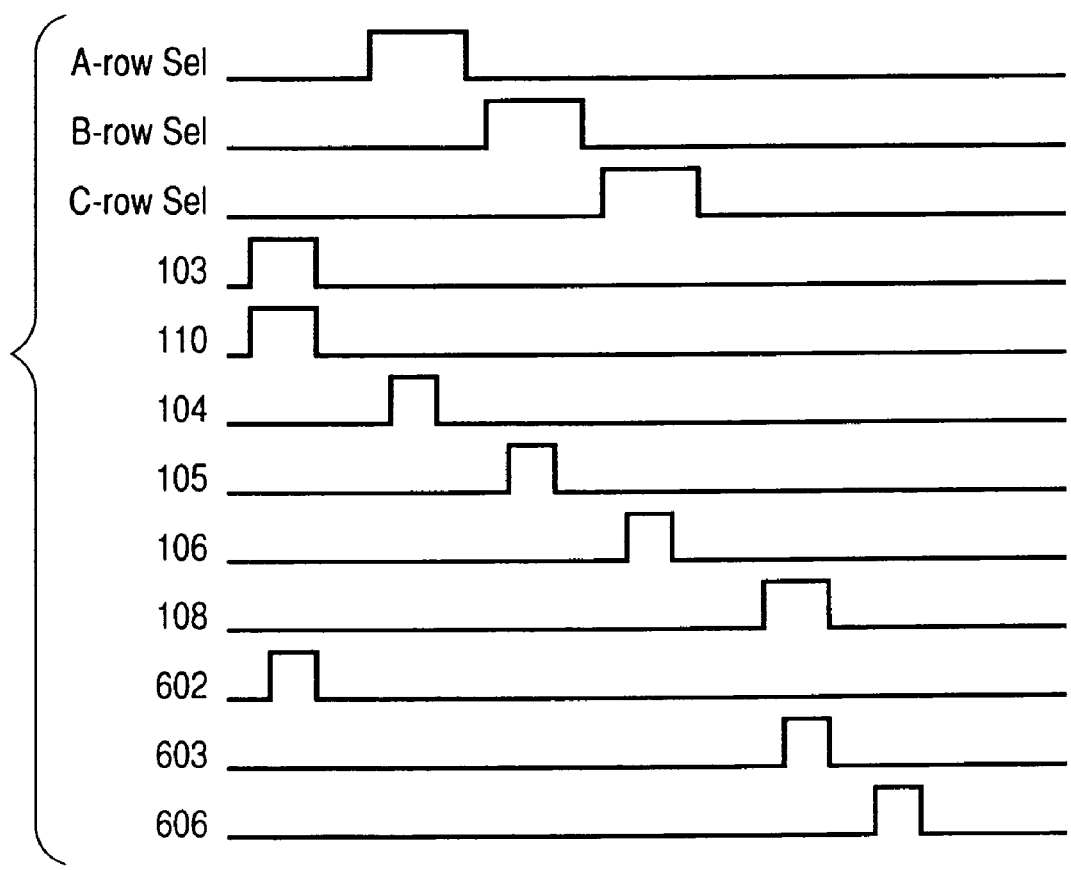
FIG. 2 is a diagram showing the operation of the solid-state image pickup device according to the first embodiment of the invention.

Operation timing for the above circuit is shown in FIG. 2. First, by turning on the MOS transistor 103, the reference voltage Vclmp for clamping is written into the common line 109. At the same time, by turning on the MOS transistor 110, the output line 111 is reset. Further, by turning on the MOS switch 602, the noise signal is written into the line memory 604. Subsequently, the A-row (photoreceiving elements 101-a to 101-c) is selected, the signal of the photoreceiving element 101-*a* is outputted to the vertical output line 112, the signal of the photoreceiving element 101-*b* is outputted to the vertical output line 113, and the signal of the photoreceiving element 101-*c* is outputted to the vertical output line 114, respectively. At this time, since the MOS transistor 103 is in the OFF state, the electric potential of the common line 109 is changed by the amount of the average output of the photoreceiving elements 101-*a* to 101-*c*. The variation of the resetting of the common line can be eliminated by the operation mentioned above and the signals of the photoreceiving elements 101-*a* to 101-*c* are added and averaged. After that, by turning on the MOS transistor 104, the addition average output of the signals from the photoreceiving elements 101-*a* to 101-*c* is held in the S/H capacitor 107-*a*.

By executing the operation similar to that mentioned above with respect to each of the B-row and the C-row, the addition average output of the signals from the photoreceiving elements 101-*d* to 101-*f* is held in the S/H capacitor 107-*b* and the addition average output of the signals from the photoreceiving elements 101-*g* to 101-*i* is held in the S/H capacitor 107-*c*, respectively.

By turning on the MOS transistors 108-*a* to 108-*c*, the addition average of the signals of nine pixels of the photoreceiving elements 101-*a* to 101-*i* stored in the S/H capacitors 107-*a* to 107-*c* is outputted to the output line 111. At this time, by turning on the MOS switch 603, the addition average signal is written into the line memory 605. Lastly, by turning on the MOS switches 606, the noise signal and the signal addition average output are read out to their horizontal output lines and a difference signal can be outputted by the differential amplifier.

Since the addition signal is sent as it is to the horizontal output line after the vertical signal components are added in the reference example, the signal components are reduced to 3C/(Ch+3C) by the capacitive division when a capacitance of the sampling and holding capacitor is assumed to be C and a capacitance of the horizontal output line is assumed to be Ch. On the other hand, according to the embodiment, since the signal voltage is once amplified by the source follower amplifier, the loss of the signal components is small.

In the embodiment, therefore, by adding the signals by using such a method, the signal addition in the horizontal direction can be executed simultaneously with the clamping operation. Although the n*H [3H in the case of the 3×3 addition] capacitors were necessary as capacitors for the addition sampling and holding in the conventional system, they can be omitted up to H+(n/m)*H [2H in the case of the 3×3 addition] capacitors. Therefore, the signal adder circuit can be simplified. By executing the addition averaging process by using such a signal adder circuit, the random noises can be also eliminated and the loss of the signal components can be suppressed.

Although sensors called CMOS sensors shown in FIG. 8 can be used as pixels which are used in the embodiment, the pixels are not limited particularly to the CMOS sensors but application of a VMIS (Threshold Voltage Modulation Image Sensor), a BCAST (Buried Charge Accumulator and Sensing Transistor array), an LBCAST (Lateral Buried Charge Accumulator and Sensing Transistor array), or the like is also possible. In particular, the application of the BCAST or LBCAST can be realized without an essential change by replacing the amplifying MOS transistor by a JFET transistor. A sensor of a type where the signal charges accumulated in the photoelectric conversion unit are transferred to a control electrode of the transistor equipped for the pixel and the amplified signal is outputted from a main electrode can be also used for the pixel in the embodiment. As an amplifying transistor, there can be mentioned: an SIT type image sensor using an SIT (A. Yusa, J. Nishizawa, et. al., "SIT image sensor: Design consideration and characteristics", IEEE trans. Vol. ED-33, pp. 735-742, June, 1986); a BASIS using a bipolar transistor (N. Tanaka-et. al., "A 310K pixel bipolar imager (BASIS)", IEEE Trans. Electron Devices, vol. 35, pp. 646-652, May, 1990); a CMD using a JFET whose control electrode is depleted (Nakamura et. al., "Gate storage type MOS phototransistor image sensor", Magazines of The Japan Society of Television, 41, 11, pp. 1075-1082, November, 1987); or the like.

Embodiment 2

Figure 3:
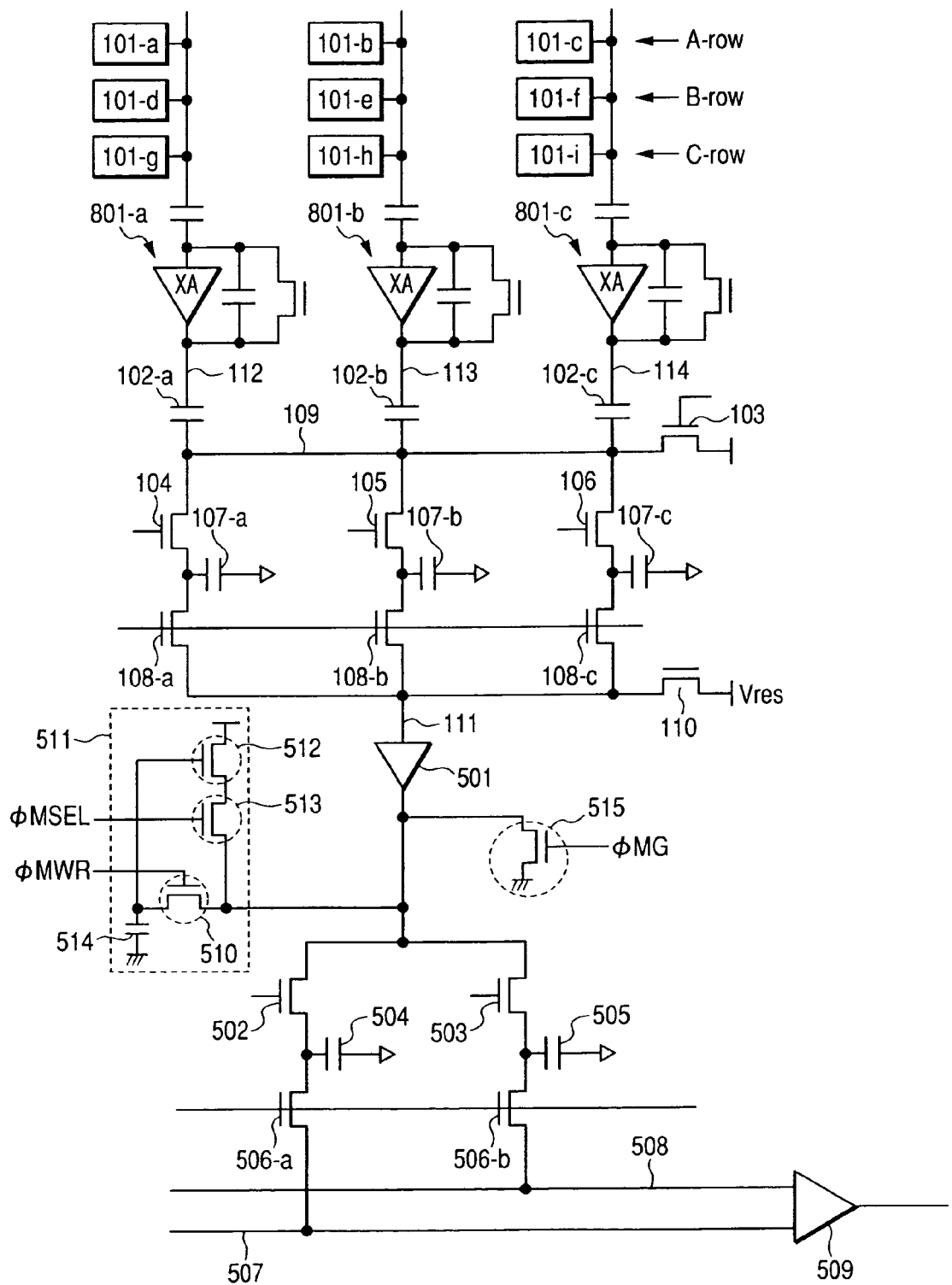
FIG. 3 is a diagram showing a circuit of a solid-state image pickup device according to the second embodiment of the invention.

FIG. 3 shows the second embodiment according to the invention. This embodiment shows an example of the case of executing the addition of signals of (3 pixels in the horizontal direction)×(3 pixels in the vertical direction) in the pixel array of (H columns×V rows).

In FIG. 3, the same or similar component elements as those shown in FIGS. 7 and 1 described in the embodiment 1 are designated by the same reference numerals and their description is omitted. Since the operation of each of the component elements designated by the same reference numerals is also similar to that of each of the component elements shown in FIG. 1, its explanation is omitted here.

According to the embodiment 2, amplifiers are provided before the clamp capacitors 102-*a* to 102-*c* and a memory unit for holding the signal obtained by adding (averaging) the signals in the horizontal direction and the signals in the vertical direction is provided. Although only one memory cell is shown here, a number of memory cells are provided in correspondence to the number of pixels. Since the adding (averaging) process of the pixels is executed here, it is sufficient that the number of memory cells is smaller than the number of pixels. However, naturally, the memory cells of the number corresponding to the number of picture elements necessary to form an image are necessary. For example, the memory unit having (640×480) memory cells is necessary to form an image of VGA.

As mentioned above, usually, the memory cells of the number corresponding to the number according to the specifications of the image to be formed are necessary.

In FIG. 3, reference numeral 501 denotes a source follower amplifier; 502, 503, 506-*a*, and 506-*b* MOS switches; and 504 and 505 line memories. By turning on the MOS switch 502, the noise signal is written into the line memory 504. By turning on the MOS switch 503, the output signal can be written into the line memory 505. By turning on the MOS switches 506-*a* and 506-*b*, the voltages written in the line memories 504 and 505 can be read out. Reference numeral 507 denotes a horizontal output line for the noise signal; 508 a horizontal output line for the output signal; and 509 a differential amplifier which can output the voltage obtained by subtracting the noise signal from the output signal.

In FIG. 3, reference numeral 801 denotes amplifiers (hereinafter, referred to as column amplifiers) having a gain over 1 for amplifying an output signal of each column. By reading out the pixel output signals through the column amplifiers, a variation in output of each vertical output line can be suppressed and the fixed pattern noise can be reduced. Although a feedback type amplifier is used here as an amplifier, a feedback type amplifier using a capacitor is, particularly, preferable. For example, in a feedback type amplifier using a resistor, when a resistance value is small, a current value is large and electric power consumption increases. When a resistance value is large, the noises increase and a response speed becomes slow. This is because the feedback type amplifier using the capacitor is more preferable in consideration of such a drawback. An offset of the amplifier can be eliminated together with the noises from the pixels by the clamping operation described in the reference example 1.

The signal amplified by the source follower amplifier 501 is written into a memory cell 511. The memory cells 511 of the number corresponding to the number of picture elements necessary to form the image are necessary and a frame memory is formed by those memory cells. They are omitted here. Each memory cell 511 is constructed by an amplifying transistor 512, a memory selecting transistor 513, a writing transistor 510, and a memory cell capacitor 514. A current supplying transistor 515 supplies a current so that the amplifying transistor 512 functions as a source follower. Although the amplifying type frame memory is used in the embodiment, a DRAM type memory comprising the writing (also reading) transistor 510 and the memory cell capacitor 514 can be also used. By using the amplifying type memory, upon reading from the memory to the storage capacitor, a signal voltage drop is not caused owing to the amplifying function of the memory cell 511.

The signal reading operation from the memory cell 511 is executed by turning on the memory selecting transistor 513. An output of the selected memory cell is sampled and held into the line memory 505 by turning on the transfer MOS switch 503.

The writing and reading operations of the noise signal into/from the memory cell 511 are executed before writing and reading of the signal. The writing operation of the noise signal into the memory cell 511 is executed by turning on the MOS transistor 110, resetting the output line 111, and writing the noise signal amplified by the source follower amplifier 501 into the memory cell 511. The reading and sampling operations of the offset written in the memory cell are executed in a manner similar to those of the signals written in the memory cell. The noise signal includes the offsets of the source follower amplifier 501 and the memory cell.

Also in the embodiment, by executing the signal addition by using such a method, the signal addition in the horizontal direction can be executed simultaneously with the clamping operation. Although the n*H [3H in the case of the 3×3 addition] capacitors were necessary as capacitors for the addition sampling and holding in the conventional system, they can be omitted up to H+(n/m)*H [2H in the case of the 3×3 addition] capacitors.

Embodiment 3

Figure 4:
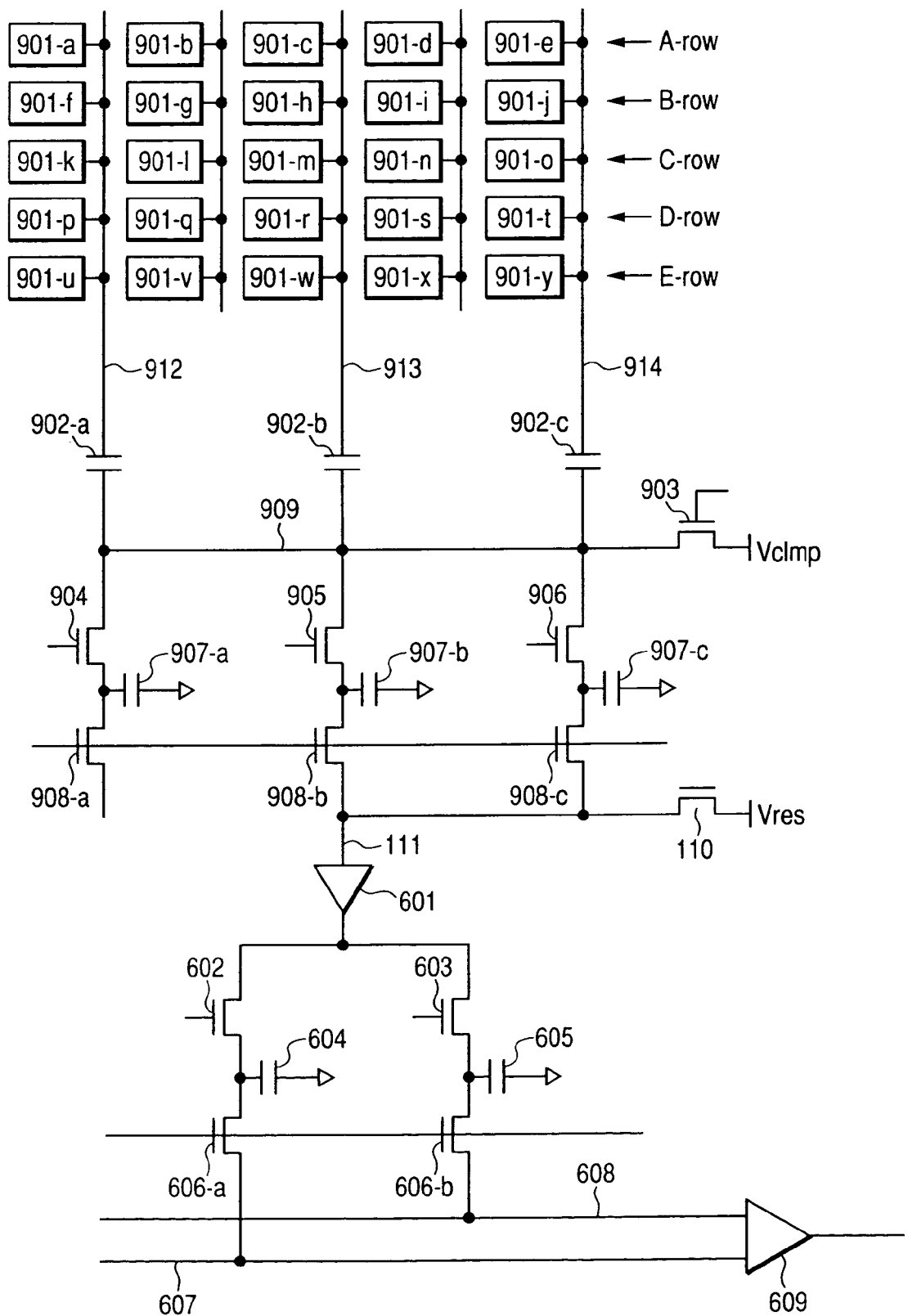
FIG. 4 is a diagram showing a circuit of a solid-state image pickup device according to the third embodiment of the invention.

FIG. 4 shows the third embodiment according to the invention. This embodiment shows an example of the case of executing the addition of signals of (3 pixels in the horizontal direction)×(3 pixels in the vertical direction) in the pixel array of (H columns×V rows) in which color filters are bayer arranged. In FIG. 4, the same or similar component elements as those shown in FIG. 1 described in the embodiment 1 are designated by the same reference numerals and their description is omitted. Since the operation of each of the component elements designated by the same reference numerals is also similar to that of each of the component elements shown in FIG. 1, its explanation is omitted here.

Reference numerals 901-*a* to 901-*y* denote photoreceiving elements which are two-dimensionally arranged and in which color filters are bayer arranged. Therefore, reference numerals 901-*a*, 901-*k*, 901-*u*, 901-*c*, 901-*m*, 901-*w*, 901-*e*, 901-*o*, and 901-*y* denote the photoreceiving elements of the same color; 901-*b*, 901-P, 901-*v*, 901-*d*, 901-*n*, and 901-*x* denote the photoreceiving elements of the same color; . . . . Reference numerals 902-*a*, 902-*b*, and 902-*c* denote clamp capacitors. The signal addition in the horizontal direction is executed by using those capacitors. Reference numeral 903 denotes an MOS switch for clamping connected to the clamp voltage Vclmp and 904 to 906 indicate MOS switches for selecting sampling and holding capacitors. Those MOS switches are used to select the S/H capacitors. Reference numerals 907-*a* to 907-*c* denote sampling and holding capacitors and 908-*a* to 908-*c* indicate MOS switches for executing the addition in the vertical direction. By simultaneously turning on those MOS switches, the voltages written in the S/H capacitors 907-*a* to 907-*c* can be averaged and the signal addition in the vertical direction can be executed. Reference numeral 909 denotes a common line for averaging the outputs after the clamping; 111 the output line; and 110 the MOS transistor for resetting the output line 111. The MOS transistor 110 is connected to the resetting voltage Vres. Reference numerals 912 to 914 denote vertical output lines and 601 indicates the output amplifier.

In this circuit, the A-row is selected, signals of the photoreceiving elements 901-*a*, 901-*c*, and 901-*e* are added and averaged on the common line 909, and its result is stored in the S/H capacitor 907-*a*. A C-row is selected, signals of the photoreceiving elements 901-*k*, 901-*m*, and 901-*o* are added and averaged on the common line 909, and its result is stored in the S/H capacitor 907-*b*. An E-row is selected, signals of the photoreceiving elements 901-*u*, 901-*w*, and 901-*y* are added and averaged on the common line 909, and its result is stored in the S/H capacitor 907-*c*. Lastly, by turning on the MOS switches 908-*a* to 908-*c*, the signals of the nine pixels of the same color can be added.

Therefore, also in the embodiment 3, the signal addition in the horizontal direction can be executed simultaneously with the clamping operation. Although the n*H [3H in the case of the 3×3 addition] capacitors were necessary as capacitors for the addition sampling and holding in the conventional system, they can be omitted up to H+(n/m)*H [2H in the case of the 3×3 addition] capacitors and the color signals of the same color can be added.

Although the solid-state image pickup device can be provided on the same semiconductor substrate in each of the foregoing embodiments, the differential amplifiers 509 and 609 can be also provided out of the substrate so that the noises caused by the differential amplifiers 509 and 609 do not exert an influence on other circuit members.

An embodiment in the case where the solid-state image pickup device according to the invention is applied to a "still camera" corresponding to a motion image will now be described in detail with reference to FIG. 5.

Figure 5:
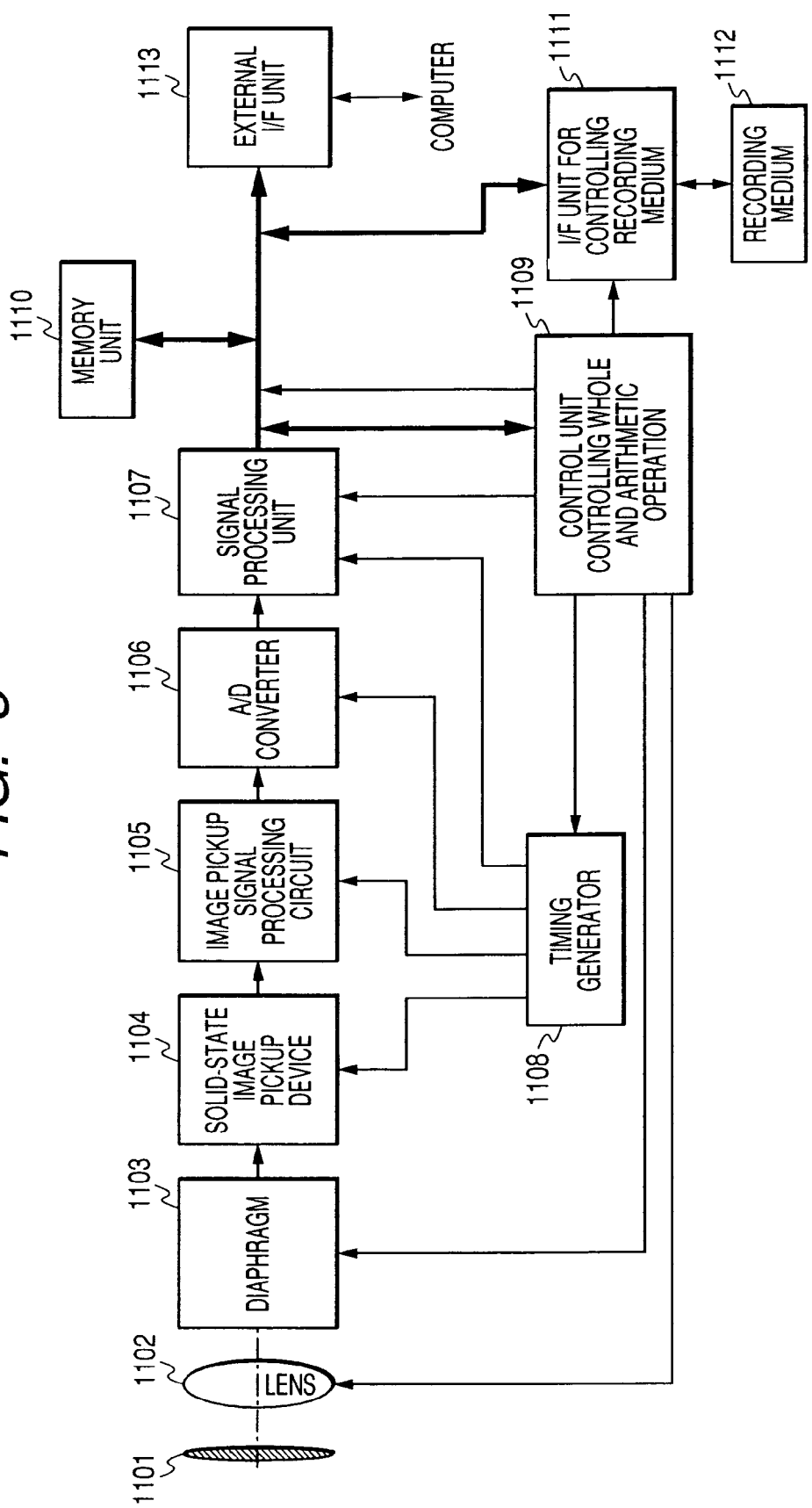
FIG. 5 is a block diagram showing the case where the solid-state image pickup device according to the invention is applied to a "still camera" corresponding to a motion image.

FIG. 5 is a block diagram showing the case where the solid-state image pickup device according to the invention is applied to the "still camera" corresponding to the motion image.

In FIG. 5, reference numeral 1101 denotes a barrier functioning as lens protecting means and serving as a main switch; 1102 a lens for forming an optical image of an object to be photographed onto an image pickup device (solid-state image pickup device) 1104; 1103 a diaphragm for varying an amount of light passing through the lens 1102; 1104 the image pickup device for fetching the object image formed by the lens 1102 as an image signal; 1106 an A/D converter for converting the analog image signal outputted from the image pickup device 1104 into the digital signal; 1107 a signal processing unit for executing various corrections to the image data outputted from the A/D converter 1106 and compressing the data; 1108 a timing generator for generating various timing signals to the image pickup device 1104, an image pickup signal processing circuit 1105, the A/D converter 1106, and the signal processing unit 1107; 1109 a control unit controlling whole and arithmetic operation for controlling various arithmetic operations and the whole still video camera; 1110 a memory unit for temporarily storing the image data; 1111 an interface unit (I/F unit) for executing the recording or reading operation into/from a recording medium; 1112 a detachable recording medium such as a semiconductor memory or the like for recording or reading the image data; and 1113 an interface unit for communicating with an external computer or the like.

The operation of the still video camera upon photographing in the foregoing construction will now be described.

When the barrier 1101 is opened, a main power source is turned on and, subsequently, a power source of a control system is turned on. Further, a power source of the circuits of an image pickup system such as an A/D converter 1106 and the like is turned on.

After that, the control unit 1109 for controlling the whole and arithmetic operation opens the diaphragm 1103 in order to control an exposure amount. The signal outputted from the image pickup device 1104 is converted into the digital data by the A/D converter 1106 and, thereafter, inputted to the signal processing unit 1107. On the basis of the digital data, the exposure amount is calculated by the control unit 1109.

Brightness is discriminated on the basis of a result of the photometric operation and the control unit 1109 controls the diaphragm in accordance with the brightness.

Subsequently, on the basis of the signal outputted from the image pickup device 1104, the high frequency components are extracted and a distance to the object is measured by the control unit 1109. After that, the lens is driven and whether or not an in-focus state has been obtained is discriminated. If it is determined that the in-focus state is not obtained, the lens is driven again and the distance is measured. After it is confirmed that the in-focus state has been obtained, the exposure is started.

After the exposure is finished, the image signal outputted from the image pickup device 1104 is A/D converted into the digital data by the A/D converter 1106. The digital data is transmitted through the signal processing unit 1107 and written into the memory unit 1110 by the control unit 1109

After that, the data stored in the memory unit 1110 is transmitted through the recording medium control I/F unit 1111 by the control of the control unit 1109 and recorded onto the detachable recording medium 1112 such as a semiconductor memory or the like.

It is also possible to transmit the data through the external I/F unit 1113, directly input it into a computer or the like, and process the image.

An example of the case (image pickup system) where the solid-state image pickup device according to the invention is applied to a video camera will now be described with reference to FIG. 6.

Figure 6:
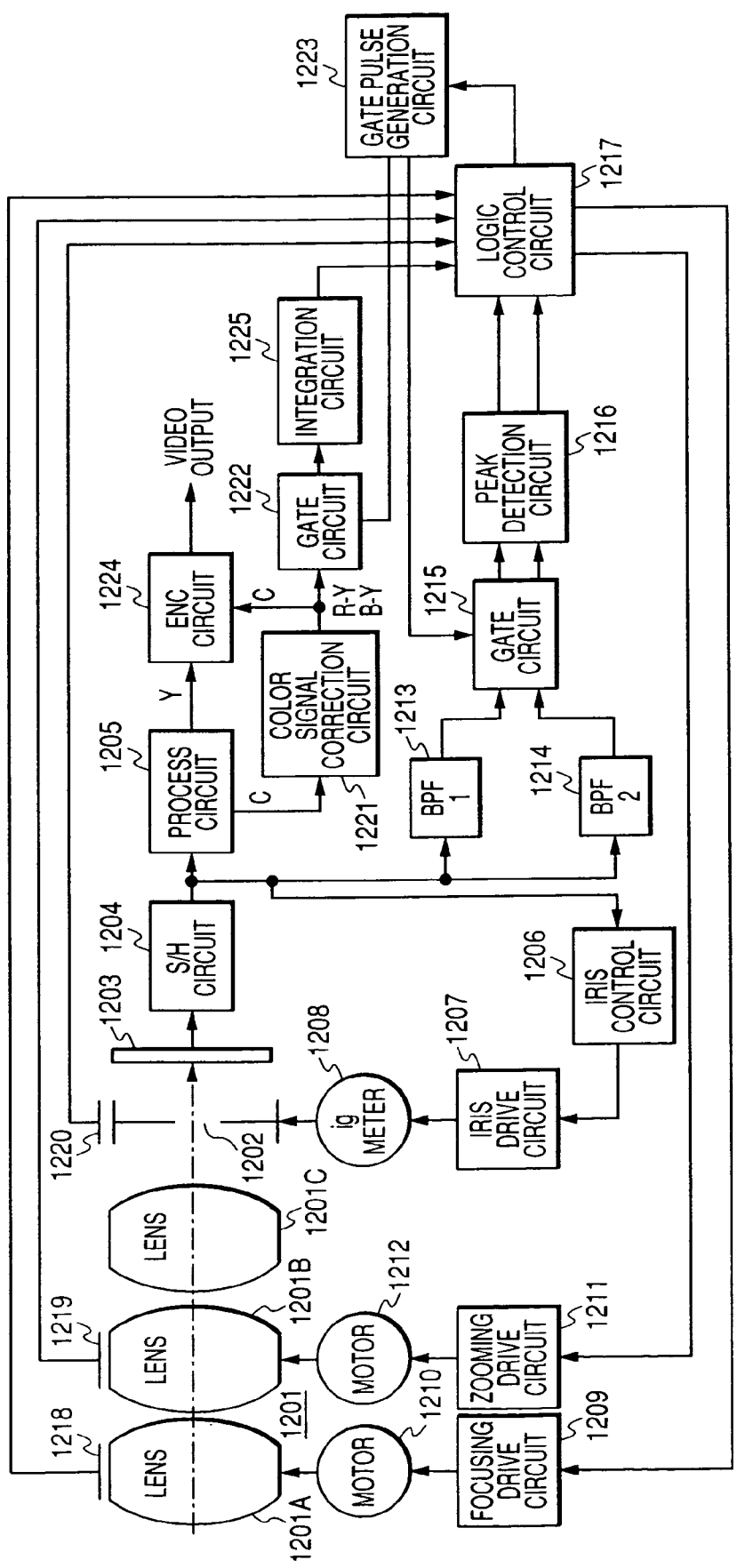
FIG. 6 is a block diagram showing the case where the solid-state image pickup device according to the invention is applied to a video camera.

FIG. 6 is a block diagram showing the case where the solid-state image pickup device according to the invention is applied to the video camera. Reference numeral 1201 denotes a photographing lens having a focusing lens 1201A to make focal adjustment, a zooming lens 1201B to execute the zooming operation, and an image forming lens 1201C.

Reference numeral 1202 denotes a diaphragm; 1203 a solid-state image pickup device for photoelectrically converting the object image formed on the image pickup plane into the electric image pickup signal; and 1204 a sampling and holding circuit (S/H circuit) for sampling and holding the image pickup signal outputted from the solid-state image pickup device 1203, further, amplifying its signal level, and outputting a video signal.

Reference numeral 1205 denotes a process circuit for executing predetermined processes such as gamma correction, color separation, blanking process, and the like to the video signal outputted from the S/H circuit 1204 and outputting a luminance signal Y and a chroma signal C. The chroma signal C outputted from the process circuit 1205 is subjected to correction of a white balance and a color balance by a color signal correction circuit 1221, so that color difference signals R-Y and B-Y are outputted.

The luminance signal Y outputted from the process circuit 1205 and the color difference signals R-Y and B-Y outputted from the color signal correction circuit 1221 are modulated by an encoder circuit (ENC circuit) 1224 and outputted as a standard television signal. The standard TV signal is supplied to a video recorder (not shown) or a monitor EVF such as an electronic viewfinder or the like.

Subsequently, reference numeral 1206 denotes an iris control circuit for controlling an iris drive circuit 1207 on the basis of the video signal supplied from the S/H circuit 1204 and automatically controlling an ig meter so as to control an opening amount of the diaphragm 1202 so that the level of the video signal is set to a predetermined value. Reference numerals 1213 and 1214 denote band pass filters (BPFs) having different limitation bands for extracting the high frequency components necessary for performing the focal detection from the video signal outputted from the S/H circuit 1204. The signal outputted from the first band pass filter 1213 (BPF1) and the signal outputted from the second band pass filter 1214 (BPF2) are gated by a gate circuit 1215 and a focusing gate frame signal. A peak value of each of the signals is detected by a peak detection circuit 1216, held, and inputted to a logic control circuit 1217.

The above signal is called a focal voltage and an in-focus state is set by the focal voltage.

Reference numeral 1218 denotes a focusing encoder for detecting a moving position of the focusing lens 1201A; 1219 a zooming encoder for detecting a focal distance of the zooming lens 1201B; and 1220 an iris encoder for detecting an opening amount of the diaphragm 1202. Detection values of those encoders are supplied to the logic control circuit 1217 for controlling the system. On the basis of the video signal corresponding to the inside of a set focal detection region, the logic control circuit 1217 performs the focal detection to the object and makes focal adjustment. That is, the peak value information of the high frequency components supplied from the BPFs 1213 and 1214 is fetched. Control signals regarding a rotating direction, a rotational speed, rotation/stop, and the like of a focusing motor 1210 are supplied to a focusing drive circuit 1209 so as to drive the focusing lens 1201A to the position where the peak value of the high frequency components becomes the maximum, thereby controlling them.

The invention is applied to the solid-state image pickup device in which the signals from the photoreceiving elements can be added in the row/column directions and it is preferably applied to, particularly, a digital camera (still camera) corresponding to the motion image, a digital video camera, and the like.

This application claims priority from Japanese Patent Application No. 2004-164637 filed on Jun. 2, 2004, which is hereby incorporated by reference herein.

What is claimed is:

1. A solid-state image pickup device comprising:
a plurality of photoreceiving elements which are two-dimensionally arranged in a plurality of rows and columns;
a plurality of signal lines to which the plurality of photoreceiving elements arranged in the column direction are connected, respectively;
a clamp circuit comprising:
a plurality of clamp capacitors connected such that each clamp capacitor has one terminal connected to one of the plurality of signal lines, to which none of the other clamp capacitors is connected, to receive and add pixel signals from the photoreceiving elements in one row, and the other terminal of each clamp capacitor for outputting the added pixel signals from the photoreceiving elements in the one row is connected commonly to the other terminals of the other clamp capacitors; and
a switching device which is connected to the other terminals of said plurality of clamp capacitors and applies a reference voltage to said other terminals by a clamping operation, and which adds signals from the plurality of photoreceiving elements provided in the row direction along with the clamping operation; and
an adding device which is connected to the other terminals of said plurality of clamp capacitors, and adds the added pixel signals from the other terminals of the clamping capacitors in the plurality of columns.

2. A device according to claim 1, further comprising:
an amplifier which is connected to said adding device and amplifies the signal output from said adding device;
a resetting device that resets an input side of said amplifier; and
a circuit that outputs an offset of said amplifier and the signal from said amplifier.

3. A device according to claim 2, wherein said amplifier is a source follower circuit.

4. A device according to claim 1, wherein said adding device comprises: a plurality of signal retainers connected to the other terminals of said plurality of clamp capacitors through said switching device, respectively; and a second switching device that short circuits said plurality of signal retainers.

5. A device according to claim 1, wherein each of said plurality of signal lines is connected to said clamp capacitors through a second amplifier that amplifies at a gain over 1.

6. A device according to claim 1, wherein color filters are formed in upper portions of the photoreceiving elements which are two-dimensionally arranged and the signals of the photoreceiving elements are of a same color.

7. A device according to claim 2, further comprising a memory unit which stores the output signal of said amplifier and is constructed by arranging memory cells corresponding to at least a part of said plurality of photoreceiving elements.

8. A device according to claim 7, wherein said memory cell is an amplifying type memory cell having at least a signal storage capacitor, a transistor that writes the signal from said memory cell, and a transistor that amplifies said signal written by said transistor, and said circuit outputs offsets of said amplifier and said amplifying type memory cell.

9. A device according to claim 2, wherein said circuit comprises:
a first storage capacitor that stores said offset;
a first transfer transistor that transfers said offset to said first storage capacitor;
a second storage capacitor that stores the signal from said amplifier or said amplifying type memory cell; and
a second transfer transistor that transfers the signal from said amplifier or said amplifying type memory cell to said second storage capacitor.

10. A device according to claim 9, further comprising a device that subtracts said offset from said signal from said circuit.

11. A camera comprising:
a solid-state image pickup device according to claim 1;
an optical system that forms an image onto said solid-state image pickup device; and
a signal processing circuit that processes the output signal from said solid-state image pickup device.

* * * * *